(12) United States Patent
Desbruslais et al.

(10) Patent No.: US 8,380,064 B2
(45) Date of Patent: Feb. 19, 2013

(54) DEPOLARISED WDM SOURCE

(75) Inventors: Stephen Desbruslais, New Eltham (GB); Richard Oberland, Eltham (GB); Stuart Robert Barnes, Whiteparish (GB); Stephen Michael Webb, Kent (GB)

(73) Assignee: Xtera Communications, Inc., Allen, TX (US)

( * ) Notice: Subject to any disclaimer, the term of this patent is extended or adjusted under 35 U.S.C. 154(b) by 468 days.

(21) Appl. No.: 12/293,797

(22) PCT Filed: Mar. 15, 2007

(86) PCT No.: PCT/GB2007/000917
§ 371 (c)(1),
(2), (4) Date: Sep. 8, 2010

(87) PCT Pub. No.: WO2007/107705
PCT Pub. Date: Sep. 27, 2007

(65) Prior Publication Data
US 2010/0322627 A1 Dec. 23, 2010

(30) Foreign Application Priority Data
Mar. 21, 2006 (GB) .................................. 0605673.3

(51) Int. Cl.
H04J 14/02 (2006.01)
H04J 14/06 (2006.01)
H04B 10/18 (2006.01)

(52) U.S. Cl. .............................. 398/65; 398/81; 398/147
(58) Field of Classification Search ................... 398/81, 398/147, 65
See application file for complete search history.

(56) References Cited

U.S. PATENT DOCUMENTS

| | | | |
|---|---|---|---|
| 2005/0123295 A1* | 6/2005 | Hullin et al. ..................... | 398/25 |
| 2006/0109875 A1* | 5/2006 | Matsushita et al. ......... | 372/29.02 |
| 2009/0123164 A1* | 5/2009 | Snawerdt ...................... | 398/188 |
| 2009/0225420 A1* | 9/2009 | Yao et al. ...................... | 359/487 |

FOREIGN PATENT DOCUMENTS
GB 2307368 A 5/1997

OTHER PUBLICATIONS

Hauer M.C. et al., "Monitoring and Control of Polarization-Related Impairments in Optical Fiber Systems"; Journal of Lightwave Technology, vol. 22, No. 1, Jan. 2004, pp. 106-125, XPO11107622, ISSn: 0733-8724.

* cited by examiner

*Primary Examiner* — Leslie Pascal
(74) *Attorney, Agent, or Firm* — Workman Nydegger

(57) ABSTRACT

A device and method for depolarising the total field of a wavelength division multiplexed (WDM) signal is provided. A polarization maintaining multiplexor combines a plurality of optical signals to form a polarized multiplexed signal. The multiplexed signal is then passed through a differential group delay (DGD) element adapted to modify the polarization state of one or more optical source signals within the multiplexed signal and thereby to at least partially depolarise the multiplexed signal.

24 Claims, 10 Drawing Sheets

DEPOLARISED WDM SOURCE

FIELD OF THE INVENTION

The present invention relates to wavelength division multiplexed (WDM) sources, and in particular to their use in ultra long haul (ULH) communications systems.

BACKGROUND OF THE INVENTION

A WDM signal will typically contain a number of data channels, that is optical signals that have been modulated in such a way as to carry information. Each data channel carries independent information, but non-linear effects in typical transmission media can lead to interference between these channels. These effects include four-wave mixing (FWM) and cross phase modulation (XPM). FWM is a non-linear effect that may occur when two or more signals of different frequencies pass through an optical fibre and which has the effect of generating a signal at a new frequency. These non-linear effects corrupt the signal, limiting the efficacy of the WDM signal in transmitting data from transmitter to receiver. Moreover, they become more significant as the frequency separation between data channels decreases, thereby acting as a limit on the number of data channels (and thus the amount of information) that can be carried by a given WDM signal.

U.S. Pat. No. 6,342,961 describes a system in which adjacent data channels are launched at orthogonal polarisations, in an attempt to mitigate the non-linear effects described above. In this system, two combs of data channels are multiplexed with a broadband orthogonal combiner such that the data channels in the resultant WDM signal alternate between orthogonal polarisation states.

In addition to data channels, WDM systems typically carry a number of loading channels. Loading channels are used within optical systems to saturate line amplifiers correctly for wide band operation and provide optimum channel powers for data carrying channels. Many modern generation systems initially operate with lower channel numbers than intended for the system, and are upgraded to meet traffic capacity demands. "Start of life" systems use loading channels as a substitute for the power of many data channels. These loading channels may be continuous wave (CW) or modulated channels.

Loading channels are multiplexed in with the data channels at the channel level, band level, or aggregate stage of the Submarine Line Terminal Equipment (SLTE).

Current transmission equipment suppliers typically use high power laser combs or filtered Amplified Spontaneous Emission (ASE) noise for loading channels. For lasers, many loading channels are required and/or they have to be modulated to overcome transmission issues. Filtered ASE sources typically have poor stop band rejection and broad linewidths that limit data channel performance.

The loading channel physical attributes, for example power, wavelength, and polarisation state, affect the performance of the data channels and therefore the upgrade strategy. Ideally, loading channels should be depolarised to avoid any polarisation issues arising from the terminal equipment and transmission line. Typically, a small number of loading channels carry most of the power for the link with the data channels acting like sensitive probe signals.

One major issue for a multi-channel repeatered system is Polarisation Dependent Gain (PDG), which is due to an effect known as Polarisation Hole Burning (PHB) whereby the available gain is saturated and depleted for a particular polarisation. If light launched into the loading channels is characterised by a high degree of polarisation, then neighbouring data channels can experience different amounts of gain when propagating through the line amplifiers. The precise level of gain will depend on the extent to which the optical signals propagating in the data channels are aligned in polarisation with light in the loading channels. Over time, system-varying effects change the relative states of polarisation between the channels, leading to a fluctuation in the optical power of the data channel. Even worse, the variation in channel power can affect the Optical Signal-to-Noise Ratio (OSNR) of the channel and also the strength of non-linear effects leading to changes in the Bit Error Rate (BER) performance of the channel.

SUMMARY OF THE INVENTION

According to a first aspect of the present invention, there is provided an optical device for a wavelength division multiplexed (WDM) transmission system, comprising: a plurality of optical sources, each optical source providing an optical source signal; a polarisation maintaining multiplexer coupled to the optical sources for multiplexing the optical source signals to form a polarised multiplexed signal; and, a differential group delay (DGD) element coupled to the output of the polarisation maintaining multiplexor, wherein the DGD element is adapted to depolarise the multiplexed signal while retaining a substantial time-averaged degree of polarisation (DOP) for each source signal.

According to a second as aspect of the present invention, there is provided a method of processing optical signals comprises the steps of: passing a plurality of optical source signals through a polarisation maintaining multiplexer to form a polarised multiplexed signal; and, passing the multiplexed signal through an optical path that includes a DGD element to depolarise the multiplexed signal while retaining a substantial time-averaged degree of polarisation (DOP) for each source signal.

The DGD element of the present invention alters the polarisation state of the source signals by an amount that depends on their frequency. Each source signal is therefore affected differently so that, while individual channels remain polarised, the resulting total optical field of the overall multiplexed signal is depolarised. This technique reduces the impact of non-linear effects on the data channels, since adjacent data channels will have different polarisation states by virtue of their differing frequencies. Moreover, the present invention overcomes the problems of PDG and PHB by introducing means to depolarise the overall WDM signal. The damaging consequences of PDG, such as fluctuations in the optical power of the data channels (which can affect the OSNR and the BER), are therefore eliminated.

The present invention therefore simultaneously provides a simple, integrated, low cost solution to a number of the problematic effects observed in WDM systems.

The benefits of the present invention with respect to PDG and PHB are particularly apparent in low channel count systems. For example, the lower the number of channels in a system, the higher the statistical probability of the channels being aligned in the detrimental way described above. Furthermore, each loading channel will provide more of the total system power, thereby having a greater effect on the saturation of the line amplifiers. In a low channel count system there is also a greater chance that a single loading channel will be the sole occupant of a spectral region, thus causing strong PHB.

The present invention allows sources which are typically used for WDM signals (such as continuous wave (CW) lasers)

to be used to produce the loading channels despite the fact that such sources create polarised signals. The DGD element alters the polarisation of one or more of the loading channels such that the overall contribution of the loading channels is effectively depolarised.

As a consequence of using sources suitable for WDM, the present invention allows loading channels to be converted into data channels (or vice versa) as and when the need arises. Moreover, these sources have narrow linewidths and high OSNRs. They also offer stable and accurate wavelength and power control.

As a loading channel is added or removed the effectiveness of the DGD in depolarising the multiplexed signal may be adversely affected. For this reason, a preferred embodiment of the present invention is capable of tuning the frequency and power level of the loading channels to ensure that the maximum level of depolarisation is always achieved. For instance, in a system of two loading channels of equal power, maximum launch depolarisation may be achieved by adopting a frequency difference between the channels that results in an orthogonal alignment of their respective polarisation states after they have passed through the DGD. If a third loading channel is added then its frequency may be chosen such that its polarisation state is parallel to one of the existing channels. In order to ensure that this results in the maximum depolarisation of the multiplexed signal it is necessary to reduce the power of the two parallel loading channels relative to that that of the remaining orthogonal loading channel.

In a preferred embodiment of the present invention, a number of groups of loading channels are utilised, where the members of each group lie within a wavelength range that is substantially smaller than the wavelength range separating the groups and each group is effectively depolarised by the DGD. This allows loading channels to be spread across the entire transmission spectrum while minimising the effect that any polarisation mode dispersion (PMD) in the fibre may have on the relative polarisation of the loading channels.

Preferably, the power and wavelength of each channel may be tuned. Tuning these parameters will affect the output polarisation of that channel, and therefore the overall degree of polarisation (DOP) of the multiplexed output signal. Accordingly, fine tuning of these parameters may be used to cancel out effects due to PMD in the fibre, thereby minimising the net PDG for the link.

While loading channels have a defined frequency, data channels, by their modulated nature, will have a finite bandwidth. As such, their state of polarisation having passed through the DGD element will vary in time around a central position. Nevertheless, the present invention ensures that the time-averaged DOP of the data channels is substantial in order to maintain a difference in the state of polarisation (SOP) between data channels at all times and therefore achieve an advantageous reduction in FWM and XPM. The time-averaged DOP of each channel is preferably greater than 0.7. More preferably, the time-averaged DOP of each channel is greater than 0.9.

The time-averaged SOP of adjacent channels is orthogonal in a preferred embodiment of the present invention. However, other relative angles may be employed. For example the time-averaged SOP of a channel may be set at 120 degrees relative to the adjacent channel. In general, the difference in time-averaged SOP between adjacent source signals in the multiplexed signal is 360/n degrees, where n is an integer greater than or equal to three.

BRIEF DESCRIPTION OF THE DRAWINGS

Examples of the present invention will now be described in detail with reference to the accompanying drawings, in which.

DETAILED DESCRIPTION

Figure 1:
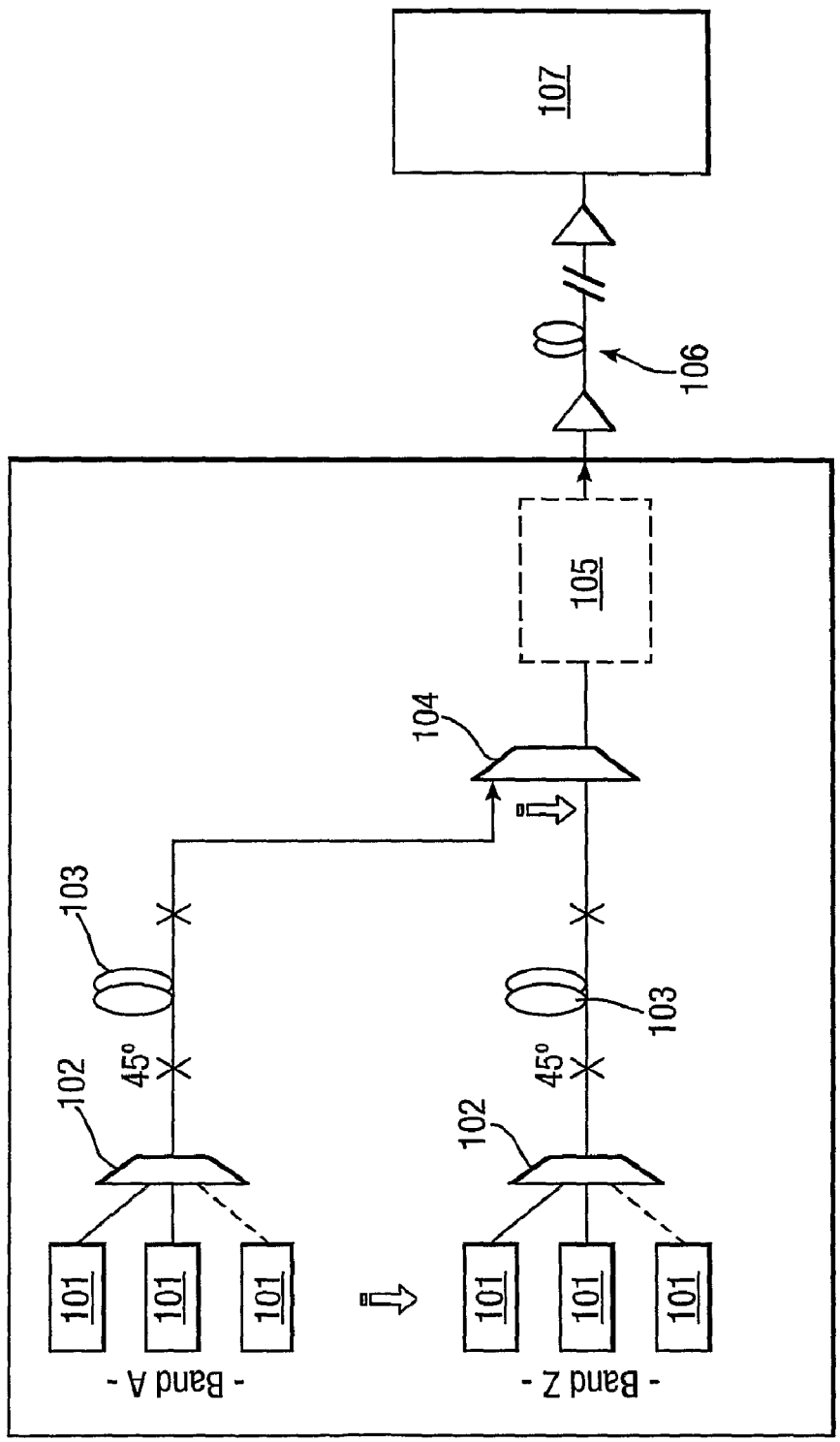
FIG. 1 is a simplified schematic of an example of a Submarine Line Terminal Equipment (SLTE) transmission system in which loading channels and data channels are combined prior to launch in a transmission line.

FIG. 1 shows a typical example of a Submarine Line Terminal Equipment (SLTE) transmission system. The channels may be any combination of loading and data channels. In the example shown, there are separate "bands" each comprising a plurality of channels. A WDM signal is formed of each band before the bands are multiplexed together to form the final signal.

As shown, a plurality of channel sources 101 in each band provide parallel polarised optical source signals that are multiplexed together by a polarisation maintaining multiplexor 102, thereby providing a polarised WDM signal. This polarised signal then passes through a DGD element 103 in order that the WDM signal may be depolarised, while the time-averaged DOP of each channel within the WDM signal remains substantial.

The depolarised WDM signals from each band are then combined by a further multiplexor 104. The combined signal passes through various other aggregate equipment 105 before being launched across a transmission line 106 to a receive side SLTE 107.

Figure 2:
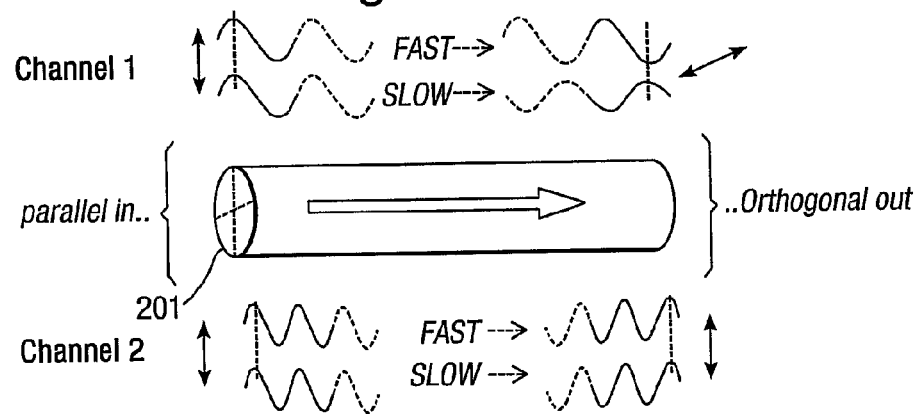
FIG. 2 illustrates the depolarisation of 2 loading channels by a DGD element.

The channel sources 101 may be continuous wave (CW) lasers. In the embodiment shown in FIG. 1, the DGD element 103 is a length of PM fibre with an axis at 45 degrees to the polarisation axis of the polarised WDM signal. FIG. 2 illustrates how such a DGD element 201 may depolarise the signal with reference to the simple case of two loading channels. The angle between the axes of the PM fibre and the polarisation of the loading channels is 45 degrees, and consequently the loading channels each have components of equal power in both the fast and slow axes of the PM fibre. Effectively, each loading channel may be considered as a superposition of two components, one component being polarised along the fast axis and one along the slow axis.

The DGD introduced between light polarised along two axes of a PM fibre depends on the fibre length chosen. For each loading channel, the polarisation state out of the fibre depends on the phase difference between the two components. The amount that the phase of each component is altered will be a function of absolute frequency and the DGD introduced in the PM fibre. By choosing the correct DGD (i.e. the correct length of fibre) for a given frequency difference between the loading channels, the output polarisation state of the two loading channels can be either parallel or orthogonally aligned. The DGD required to give orthogonal states (and thus effectively depolarised light) is approximately $(1+2n)/2\Delta f$ where $\Delta f$ is the frequency difference between the loading channels in Hz and n is an integer. It is worth bearing in mind here that, unlike a loading channel, a data channel has a finite bandwidth and as such the relevant frequency difference is that between the central frequencies of the two channels.

Figure 3:
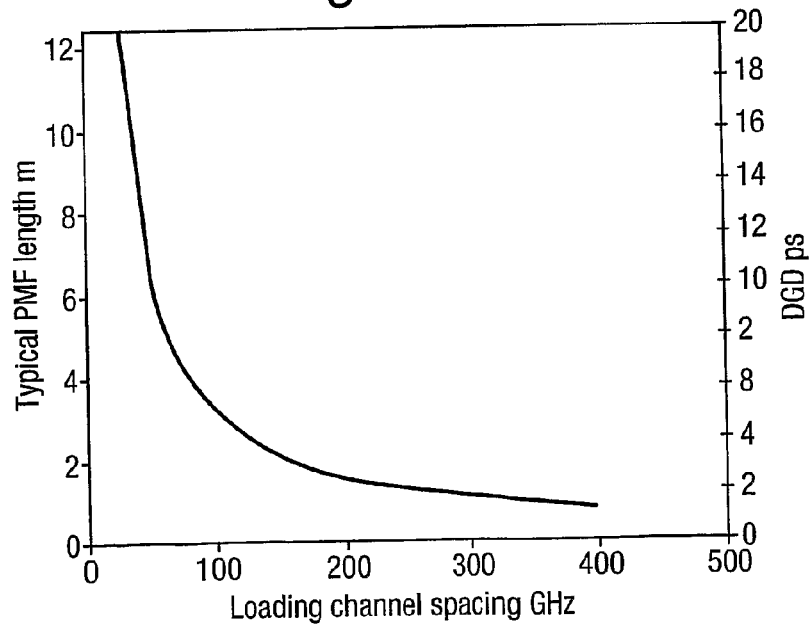
FIG. 3 is a graph of Polarisation Maintaining Fibre (PMF) length and DGD versus loading channel spacing.

FIG. 3 shows the typical PM fibre length required to give orthogonal states as a function of channel spacing.

As would be clear to one skilled in the art, the DGD element need not necessarily be a PM fibre. One example of an effective implementation uses a birefringent crystal (or any other birefringent element). Alternatively, DGD may be realised by physically separating the two polarisation modes of the channels and placing a different delay in the path of each mode before recombining them.

It is worth considering the beneficial effects of the present invention on data and loading channels separately, not least because data channels have a finite bandwidth whereas loading channels generally do not.

Figure 4:
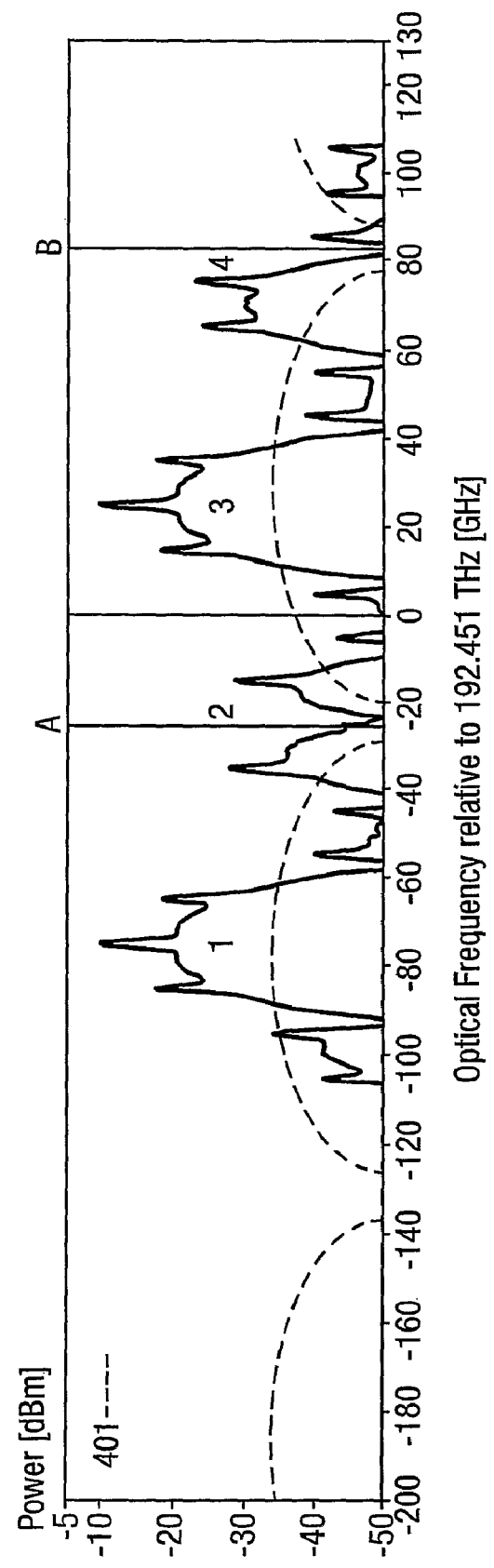
FIG. 4 shows the frequency response through a polarisation filter for four data channels and a noise signal having passed through a DGD element.

FIG. 4 shows the spectrum of four modulated data channels and a polarised noise signal 401 having passed through a DGD element and then a polariser aligned to two of the channels (1 and 3). The noise response 401 clearly shows the frequency dependence of the polarisation of the output of the DGD element. Moreover, it can be seen that the adjacent channels (2 and 4) have been effectively suppressed with respect to those aligned with the polariser. This suppression effect will be stronger the narrower the data channels relative to the channel spacing.

As stated previously, the effect of the DGD element on the SOP of a signal depends on its frequency. When a signal having a finite bandwidth (such as a data channel) passes through such an element the resultant SOP will be time-varying between extremes associated with the maximum and minimum frequency contained in the bandwidth. Assuming a symmetrical distribution across the bandwidth, the time-averaged SOP will be equivalent to the SOP resultant from a simple wave having the central frequency in the bandwidth.

Figure 5:
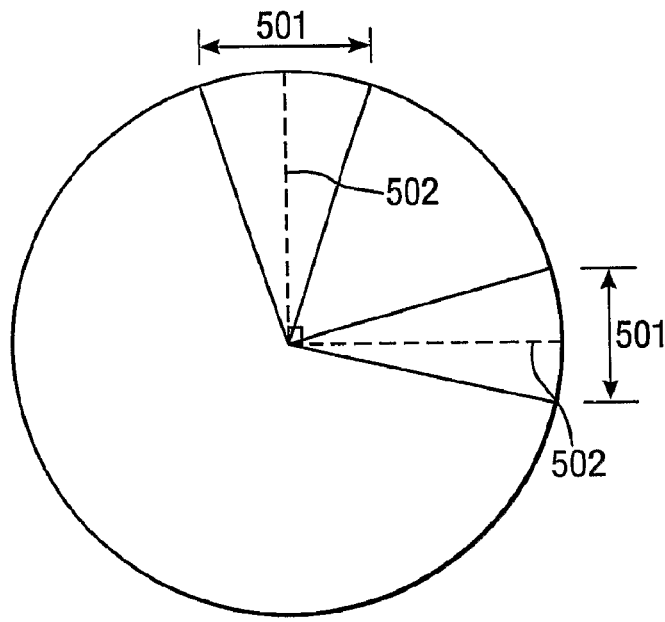
FIG. 5 is a figurative illustration of the range and time averaged values of the SOP of two data channels having passed through a DGD element.

FIG. 5 illustrates figuratively the significant range of SOP 501 and the time-averaged SOP 502 for two data channels, having passed through a DGD arranged to ensure that their time-averaged SOPs are orthogonal to each other. The larger the spread, or range, of the SOP the lower the time-averaged DOP for each channel will be. Clearly it is advantageous to have a significant time-averaged DOP so that the channels' SOPs never overlap.

The reason that the SOP of a data channel will vary with time can be understood as by consideration of the simple case of two co-propagating monochromatic waves having slightly different frequencies. This will effectively act as an infinitely long return-to-zero signal due to the beating between the fields. Should these two signals be orthogonal then the time-averaged DOP will clearly be zero. However, the DOP of each field will be unity. Considering the progress of the total field (that is, the combination of the two signals) the SOP will evolve in time with a period equal to the inverse of the beat frequency. The SOP will clearly vary between the SOP of each monochromatic signal depending on the relative strength of each field at any given point. Since a real data channel is effectively a superposition of monochromatic waves across the bandwidth a similar process will occur, although it will lack the periodic behaviour. For this reason, the relevant DOP and SOP of channels that have passed through a DGD element are the time-averaged values, and it is therefore the time-averaged values to which this specification refers unless otherwise specified.

Figure 6:
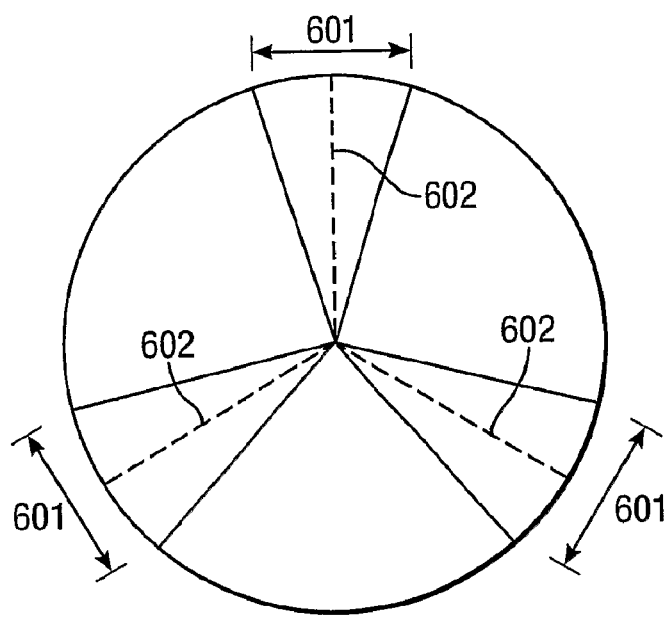
FIG. 6 is a figurative illustration of the range and time averaged values of the SOP of three data channels having passed through a DGD element.

FIG. 5 shows the case where the time-averaged SOP of two data channels are orthogonal. However, orthogonality between the time-averaged SOP of adjacent channels means that the time-averaged SOP of each channel is parallel to that of the next but one channel. In situations where channel spacing is low, this can lead to the occurrence of the detrimental non-linear effects (for example, FWM and XPM) between alternate channels. It is therefore preferable in some circumstances to adopt a different angle between the time-averaged SOP of adjacent channels. For example, an angle of 120 degrees may be chosen. FIG. 6 illustrates this situation simplistically, showing the range 601 and time averaged SOP 602 for three data channels. In general, the angle between the time-averaged SOP of the channels is preferably 360/n degrees, where n is an integer greater than or equal to 3.

The present invention is arranged that, while the overall DOP for the multiplexed signal is minimized, the DOP for each channel within multiplexed signal remains substantial. This reduces the possibility of XPM and FWM between channels. Moreover, reducing the DOP of a data channel by passing it through a DGD element also carries an inherent Q penalty (since, as explained above, the signal will be slightly spread out as components polarised along the fast axis of DGD will arrive prior to components polarised along the slow axis). It is therefore preferable that the DOP of each channel is greater than 0.7, and more preferably greater than 0.9.

Figure 7:
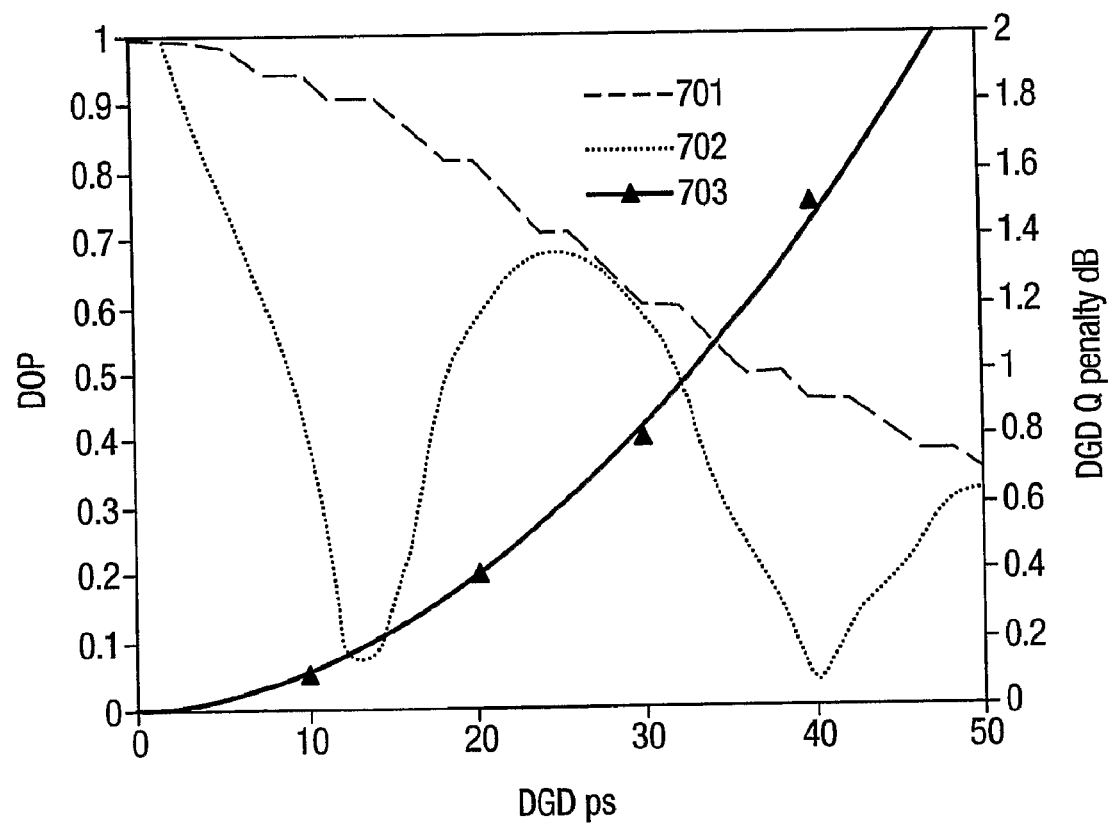
FIG. 7 illustrates the effect of DGD upon the DOP of a multiplexed signal formed of the two 10 Gbps data channels spaced 37.5 Ghz apart, and also illustrates the Q penalty for each channel caused by the DGD along with the effect of the DGD on the DOP of each channel.

FIG. 7 illustrates the difference between the DOP of the multiplexed signal 702 and that of the individual channels 701, and also shows the Q penalty 703 due to the DGD element for each channel. In the example shown, two 10 Gbps RZ channels are separated by 37.5 Ghz. As shown, the first minimum (that is, the point at which the time-averaged SOP of the channels are orthogonal) in the DOP 702 of the combined signal occurs at a DGD of around 13 ps, with a DOP 701 for each channel of approximately 0.9. Moreover, the DGD Q penalty 703 for each channel at this point is small at around 0.2 dB.

FIGS. 5 and 6 are simplistic representations of the SOP for illustrative purposes only. A more rigorous representation can be achieved using a Poincaré sphere, which allows the representation of circularly as well as linearly polarised light. In this context it is possible to illustrate the mathematical fundamentals of DOP and SOP. The definitions of DOP and SOP are well known in the art and can be found, for example, in "Principles of Optics" by Born and Wolf published by Cambridge University in 2002. The field of a monochromatic wave can be expressed as $$E_x = a_x \cos(\omega t - k_x(\omega)z + \delta_x)$$

$$E_y = a_y \cos(\omega t - k_y(\omega)z + \delta_y)$$

Here, the propagation constants $k_x(\omega)$ and $k_y(\omega)$ are different in the x and y directions and the phase difference due to the difference in propagation constants after a given propagation distance z relative to the phase at launch is then $(k_x(\omega) - k_y(\omega))z$.

The Stokes parameters are defined by:

$$s_0 = a_x^2 + a_y^2$$

$$s_1 = a_x^2 - a_y^2$$

$$s_2 = 2a_x a_y \cos \delta$$

$$s_3 = 2a_x a_y \sin \delta$$

where $\delta = \delta_y - \delta_x$. The normalised SOP is given by the vector $(s_1 s_2 s_3)^T / \sqrt{s_1^2 + s_2^2 + s_3^2}$.

Figure 8:
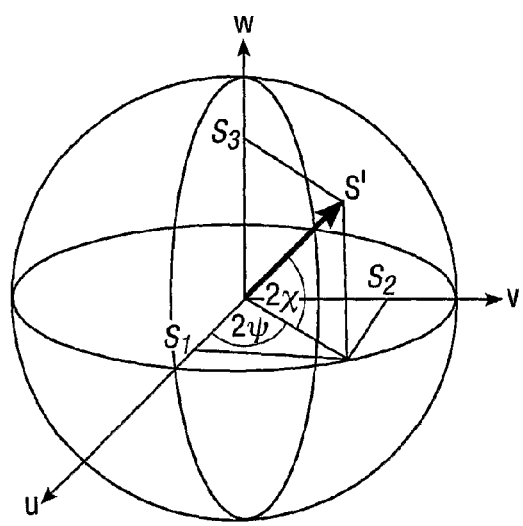
FIG. 8 illustrates the Poincaré sphere.

FIG. 8 shows the SOP represented on the Poincaré sphere. The north-south axis of the sphere represents the degree to which light is right-circularly or left-circularly polarised, while the angle around this axis represents the angle of linear polarisation. As such, the upper and lower poles represent left and right-circularly polarized light, points on the equator indicate linear polarization, and other points on the sphere represent elliptical polarization.

If there are many wavelengths present, then we use the time-averaged Stokes parameters:

$$s_0 = \langle a_x^2 + a_y^2 \rangle$$

$$s_1 = \langle a_x^2 - a_y^2 \rangle$$

$$s_2 = \langle 2a_x a_y \cos \delta \rangle$$

$$s_3 = \langle 2a_x a_y \sin \delta \rangle$$

The DOP of a set of m fields, each of which can have different wavelengths is defined by:

$$DOP = \frac{\sqrt{\left(\sum_{j=1}^m s_{1j}\right)^2 + \left(\sum_{j=1}^m s_{2j}\right)^2 + \left(\sum_{j=1}^m s_{3j}\right)^2}}{\sum_{j=1}^m s_{0j}}$$

If we use a birefringent fibre in accordance with the preferred embodiment of the present invention, then the DGD $\tau_g$ is chosen such that:

$$\tau_g = \frac{\Delta \theta}{\pi \Delta \nu}$$

where $\Delta\theta$ is the required angle of separation between channels on the Poincaré sphere and $\Delta\nu$ is their frequency separation. In the present invention, the channel sources are launched with a linear SOP (i.e., with $s_3 = 0$ at z=0), preferably at 45° to the x-axis ($s_1 = 0$). The corresponding average Stokes parameters for m equally spaced wavelengths ($m\Delta 2\theta = 2\pi$) are:

$$s_{0,tot} = 2 \sum_{j=1}^m a_{x_j}^2$$

$$s_{1,tot} = 0$$

$$s_{2,tot} = 2 \sum_{j=1}^m a_{x_j}^2 \cos(\omega_1 - (j-1)\Delta\omega)\tau_g$$

$$s_{3,tot} = 2 \sum_{j=1}^m a_{x_j}^2 \sin(\omega_1 - (j-1)\Delta\omega)\tau_g$$

Where $\Delta\omega = 2\pi\Delta\nu$. If we assume that the amplitudes of each wavelength are equal, the sums can be evaluated and it is found that the DOP is zero. The wavelengths are distributed uniformly around the circle formed by the intersection of the Poincaré sphere and the $S = s_1$ plane.

Figure 9:
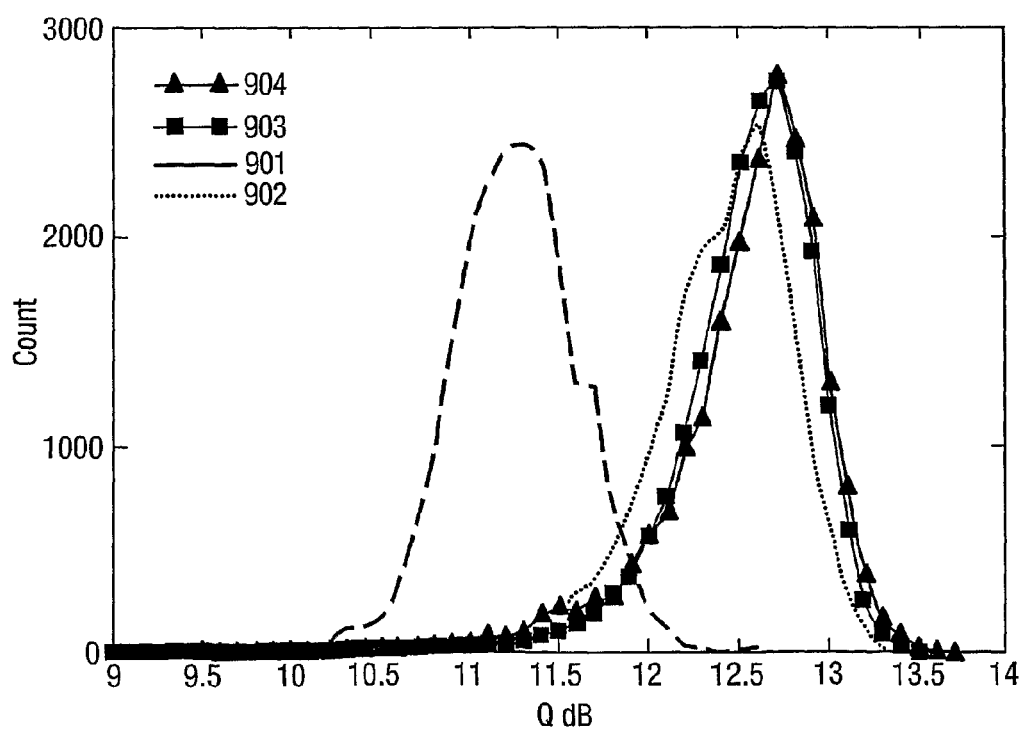
FIG. 9 is a histogram illustrating the benefits of the present invention to Q value in a 6000 km recirculating loop experiment.

FIG. 9 illustrates the performance benefit for data channels of the present invention through a histogram of the Q values of the received signals in a 6000 km loop system. Line 901 illustrates the received Q values in a system using data channels having parallel polarisation, while the line 902 illustrates the results in a system where adjacent channels are launched with steady state linear but orthogonal polarisations. There is a clear benefit in the use of orthogonal data channels. The remaining two plots illustrate the effects of the present invention for cases where the time-averaged SOP of adjacent channels after passing through the DGD element are orthogonal (line 903) and at 120 degrees (line 904). It can be seen that a slight additional benefit is found over the simplistic case of launching channels orthogonally, and a significant benefit is found with respect to the parallel launch of data channels.

Figure 10:
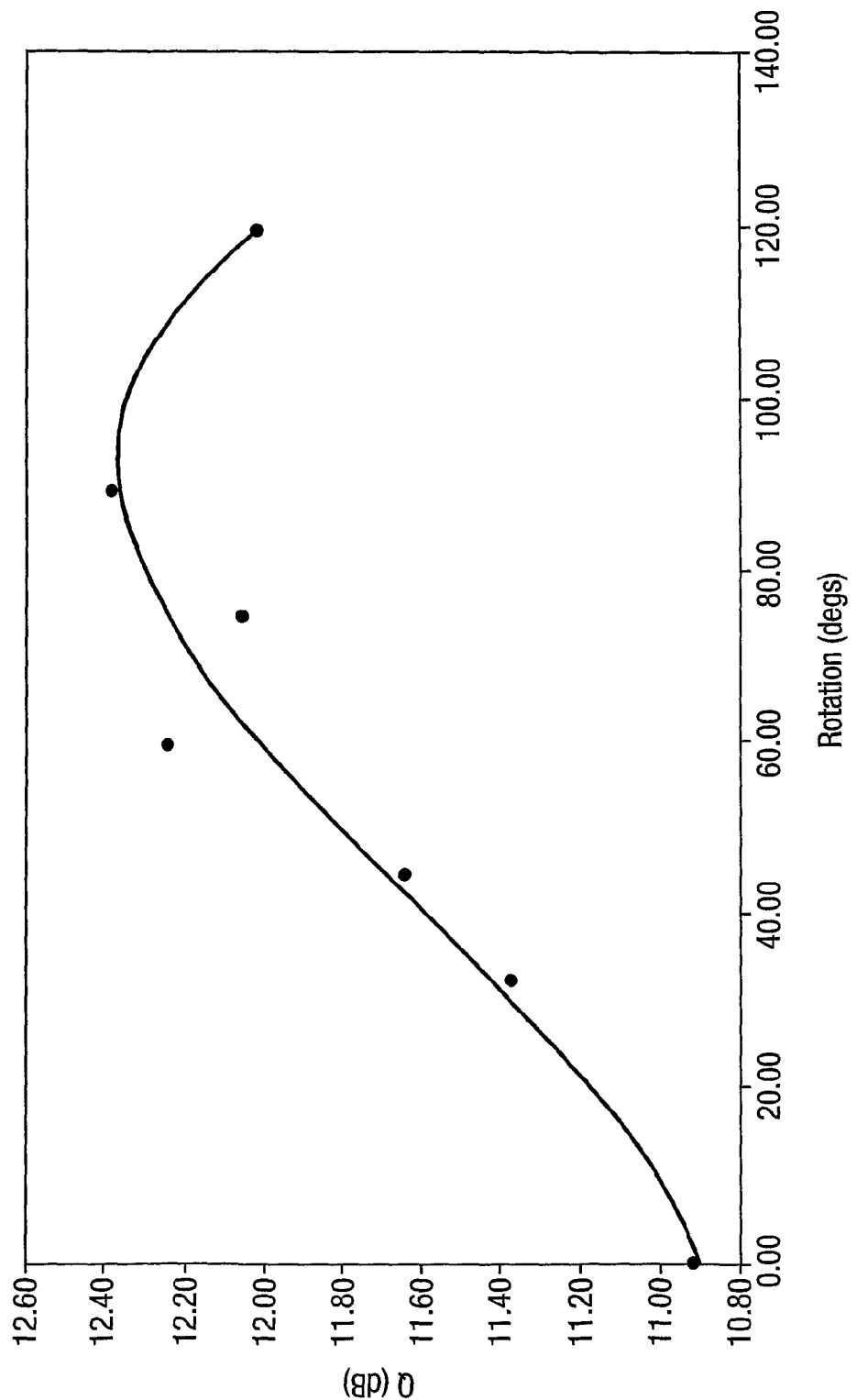
FIG. 10 shows Q value against the relative rotation angle for two data channels in the experiment of FIG. 8.

FIG. 10 shows the Q variation versus the rotation angle between the time-averaged SOP of the channels for the same loop experiment as FIG. 9. The channel spacing is fixed and the rotation angle is adjusted by changing the length of the DGD element (in this case a PM fibre) after the channels have been multiplexed. The plot shows a >1.4 dB mean Q improvement by changing the angle from aligned (0°) to orthogonal (90°). Moreover, angles close to 90° also have good performance. This demonstrates that there is a good tolerance to incorrect channel spacing or PM fibre length in the system.

An additional performance benefit could be found by changing the absolute polarisation state of each channel over time. Using the apparatus described here, the absolute polarisation state can be changed by adjusting the wavelengths of the channels whilst maintaining the same channel spacing. In this way adjustments can be made in response to changes in the accumulated PMD of the system (which can vary over time and independently for each wavelength) to ensure that the Q values fall within the upper part of the histogram shown in FIG. 9.

Beneficially, the present invention is effective not only to depolarise data channels in order to mitigate effects such as FWM and XPM, but also to depolarise loading channels, thereby reducing the effect of PDG.

The loading channels are "dummy" channels, which are included to ensure the performance of the transmission system is satisfactory for the optical signals propagating in the data channels.

Figure 11:
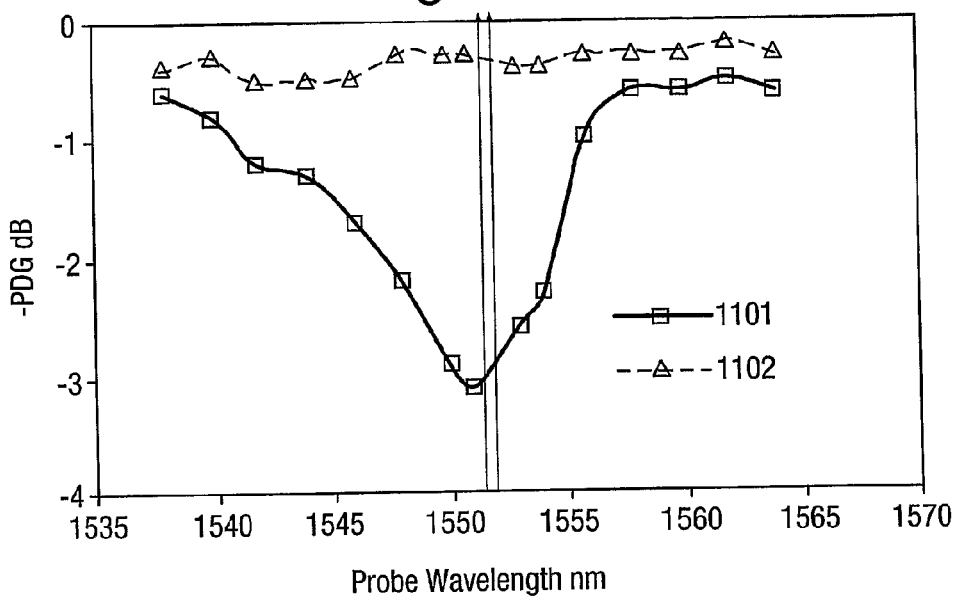
FIG. 11 is a graph of Polarisation Dependent Gain (PDG) versus wavelength for a probe signal passing through a chain of amplifiers, loaded with 2 highly polarised signals.

FIG. 11 shows the impact the polarisation dependent gain (PDG) on a probe signal passing through a chain of amplifiers, along with two closely spaced, highly polarised loading signals. Line 1101 illustrates the response when the loading channels are parallel while line 1102 illustrates the response when the loading channels are orthogonal. As can be seen from the Figure, when the two loading signals are parallel the effect of PDG is significantly increased. In contrast, with orthogonal polarisation states the overall loading power appears depolarised to the line amplifiers, and hence the PDG is suppressed. The vertical arrows in FIG. 11 indicate the frequencies of the loading signals.

Typically, a number of Constant Wavelength (CW) laser sources are used to provide optical sources for loading channels that are tuneable in both power and wavelength.

Laser diode arrays are now available with an integrated coupler and optical amplifier. In an array of n lasers, generally one of the n lasers is switched on with a highly polarised and polarisation maintained output to interface to an external data modulator. It is possible, however, to switch on more than one laser, thereby providing a tuneable Polarisation Maintaining (PM) multi-channel source.

Figure 12:
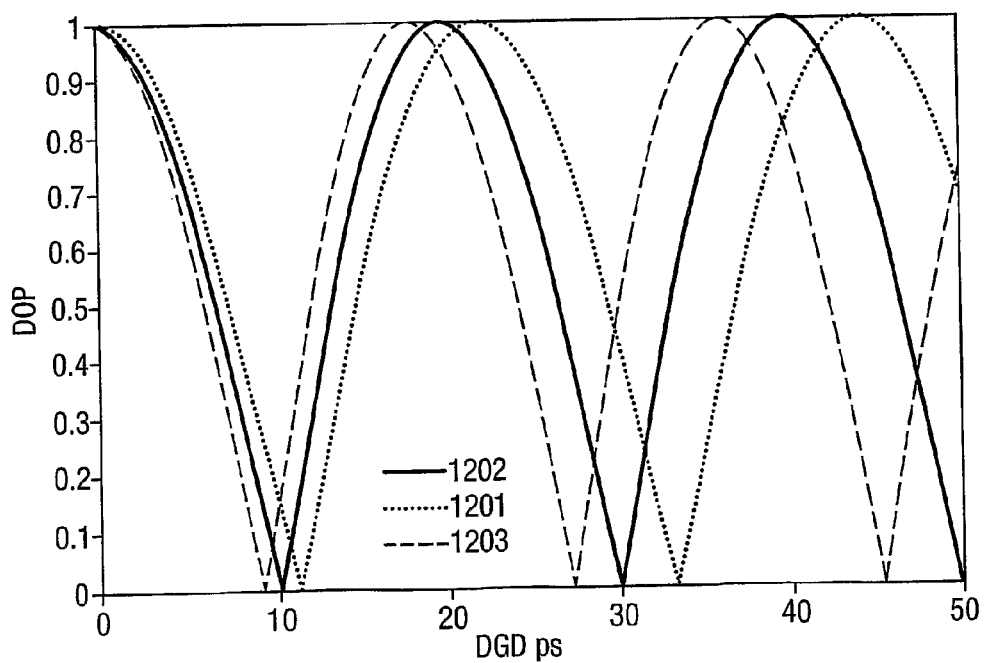
FIG. 12 is a graph of Degree Of Polarisation (DOP) versus DGD for 2 loading channels.

FIG. 12 shows the DOP of two loading channels versus DGD. The Figure shows the relationship for channels that are separated by 45 (line 1201), 50 (line 1202), and 55 GHz (line 1203). As shown, the zeroth order minimum in DOP for loading channels spaced by 50 GHz occurs at a DGD of 10 ps and, in general, the nth order minima occur at (10+n*20) ps. Moreover, it can be seen that for a 10 GHz range of channel spacings a DOP of less than 0.2 (or less than 20%) is achieved with a fixed DGD of 10 ps. As such, the apparatus is able to absorb a slight drift in the wavelength of the light produced by the lasers without substantial loss of performance. As shown, this tolerance to drift is substantially reduced at higher order minima.

Figure 13:
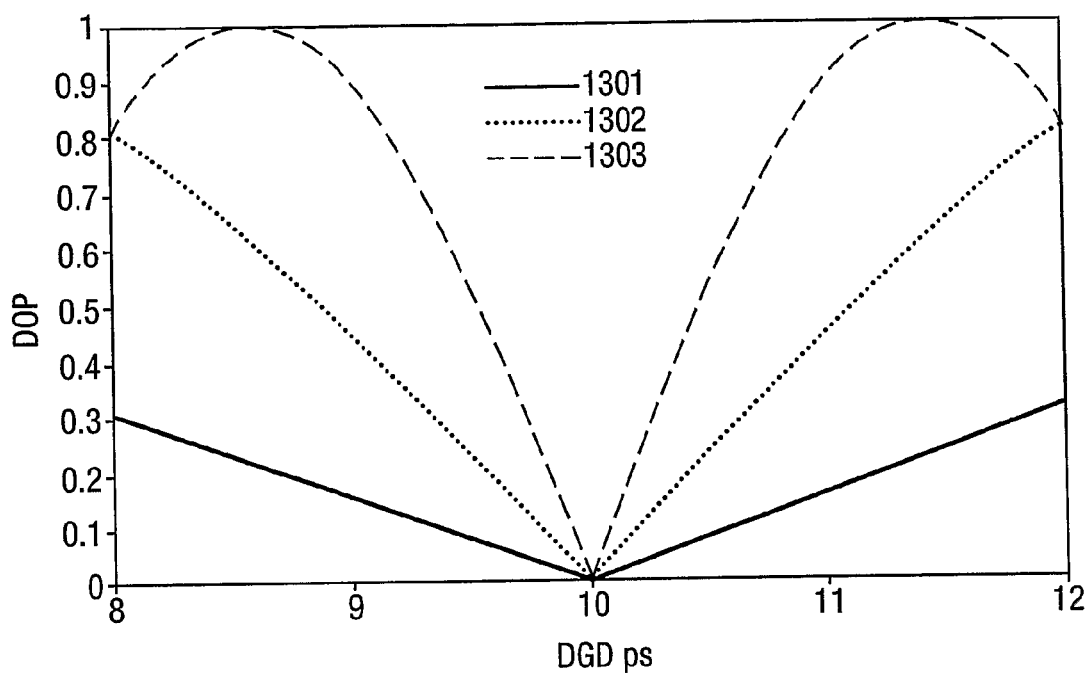
FIG. 13 is a graph of DOP versus DGD for different channel spacings.

An infinite number of different channel spacings will result in a minimum at a given DGD value. FIG. 13 illustrates that channel spacings of 50 Ghz (line 1301), 150 GHz (line 1302), and 350 GHz (line 1303) all result in a minimum at 10 ps. In general, at a DGD of 10 ps, channel spacings of (50+n*100) GHz will provide minimums. However, as shown, channel spacings of higher order (larger n) have less tolerance to any variation in DGD.

Though the above discussion relates to an embodiment of the present invention that uses two loading channels, it should be recognised that any number of loading channels may be used.

Figure 14A:
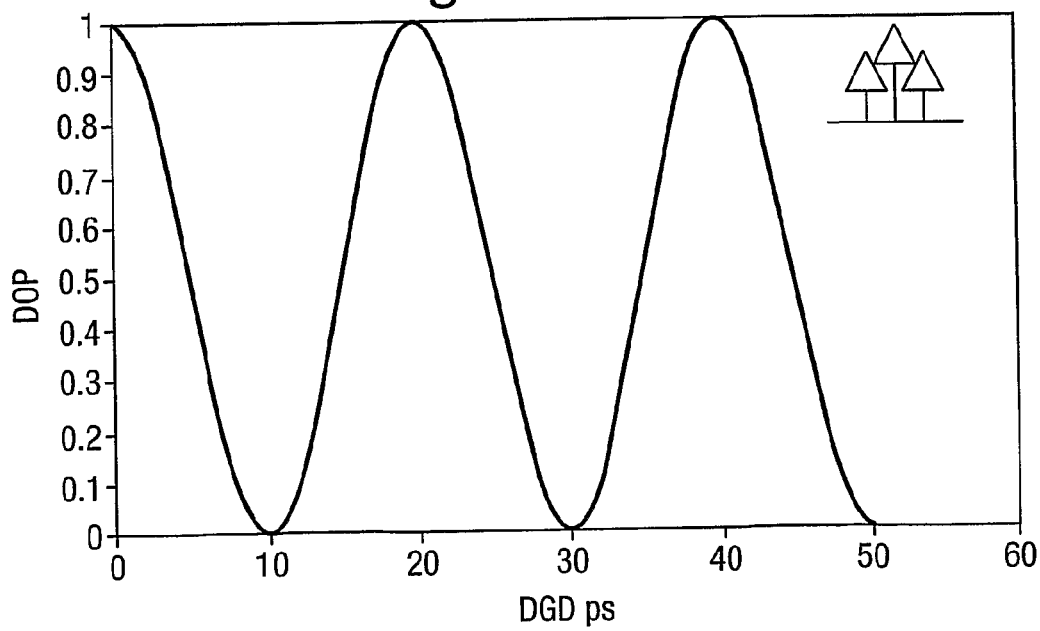
FIGS. 14A and 14B are graphs of DOP versus DGD for 3 and 5 loading channels, respectively; and, FIG. 15 is a graph of decorrelation distance versus wavelength separation.
Figure 14B:
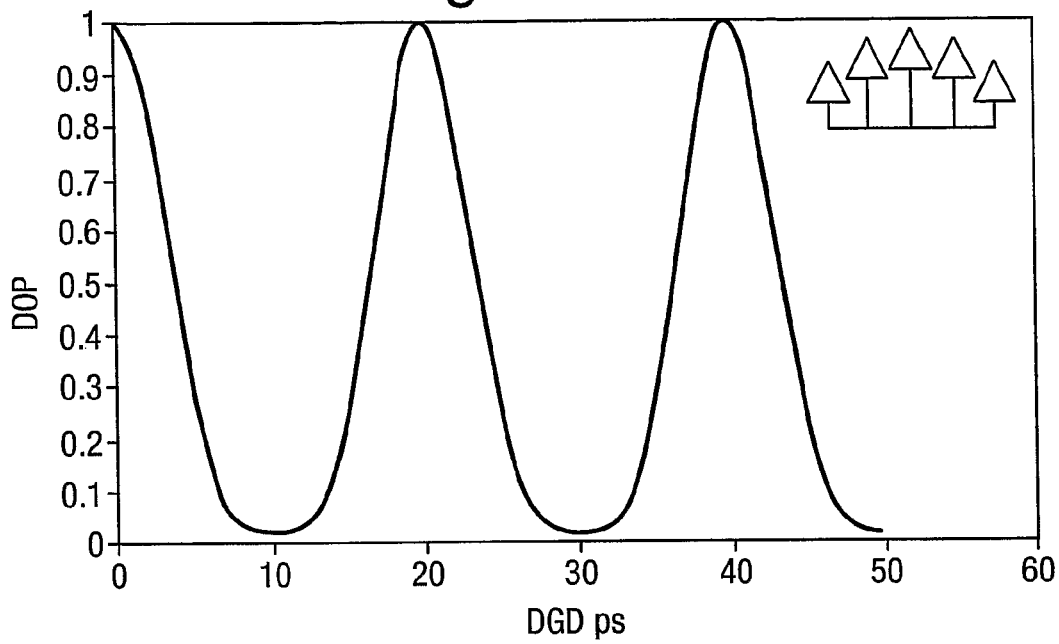

FIG. 14 shows the DOP versus DGD for systems incorporating 3 (FIG. 14A) and 5 (FIG. 14B) loading channels. In the case of three loading channels, the degree of polarisation is minimized when the channel with the central frequency is orthogonally polarised to the two outer channels. To ensure that the amount of power transmitted in each polarisation state is equal (and thus that the DOP is minimized) the power of the two outer channels is reduced to approximately 0.5 times the power of the centre channel. Similarly, in the case of five loading channels the polarisation state preferably alternates, and accordingly the inner channels are preferably set to have ~0.64 times the power of the centre channel while the outer channels have ~0.16 times the centre channel power. In general, the minimum DOP will be available in a system of n channels of a first polarisation and m channels of a second, orthogonal polarisation if the following equation is satisfied:

$$\sum_{i=1}^{i=n} P_i = \sum_{j=1}^{j=m} P_j$$

where P is the power of a given channel.

As can be seen from FIG. 14, the greater the number of loading channels the greater the tolerance of the overall DOP to variation in the DGD.

As described above, a depolarised state may be achieved through the combination of orthogonally polarised signals. However, as one skilled in the art would readily recognize, various other combinations of individually polarised signals will lead to an overall DOP of zero. For instance, a combination of signals of equal power polarised to 0, 120, and 240 degrees will give an overall DOP of zero. In general, if the loading channels take n different polarisations then these will be at 0, 360/n, 2*360/n, 3*360/n, and similarly up to (n−1)*360/n degrees.

As well as being linearly polarised, the loading signals may be circularly polarised. In this case, a combination of left and right-handed circularly polarised signals can also be chosen to give an overall DOP of zero.

Figure 15:
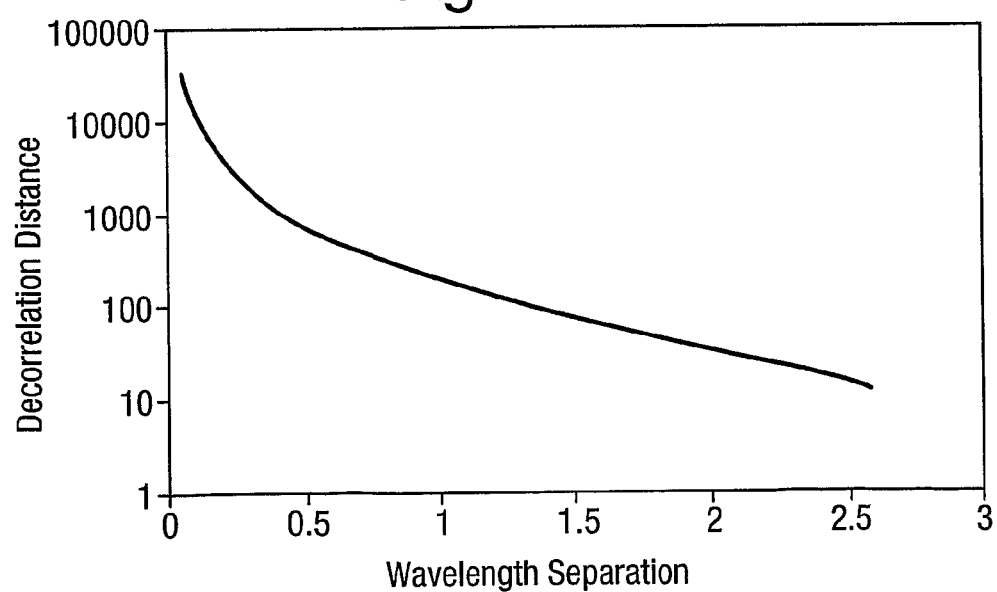

Transmission fibres inevitably suffer from some polarisation mode dispersion (PMD) which will mean that over long distances the polarisation alignment of the loading channels will not be maintained. FIG. 15 illustrates how the decorrelation distance (the distance at which the relationship between the polarisations of different signals is no longer maintained) relates to the wavelength separation between the loading channels. As shown, the closer the loading channels are in wavelength the greater the decorrelation distance.

It is often necessary to deploy loading channels across the entire transmission band. However, as shown in FIG. 15, a large wavelength separation between loading channels leads to a small decorrelation difference. In one embodiment, a plurality of orthogonally polarised loading channel pairs are deployed across the wavelength spectrum, with the loading channels in each pair close in wavelength in order to maximise the decorrelation distance. Advantageously, the wavelength separation of each pair is the same, thus enabling a single PM fibre to provide the DGD means to depolarise all the channel pairs. Though the above describes the use of a number of pairs of loading channels, other small groups (such as those described above consisting of three or five channels) may be used as an alternative.

The invention claimed is:

1. An optical device for a wavelength division multiplexed (WDM) transmission system comprising:
    a plurality of optical sources, each source providing an optical source signal;
    a polarisation maintaining (PM) multiplexer coupled to the optical sources for multiplexing the optical source signals to form a polarised multiplexed signal; and,
    a differential group delay (DGD) element coupled to an output of the PM multiplexer, wherein the DGD element is adapted to depolarise the multiplexed signal while retaining a substantial time-averaged degree of polarisation (DOP) for each source signal, wherein the DGD element is adapted such that the angle between the time-averaged state of polarisation (SOP) of adjacent optical source signals in the depolarised multiplexed signal is 360/n degrees, where n is an integer greater than or equal to three.

2. An optical device according to claim 1, wherein the DGD element is adapted to retain a time-averaged DOP of above 0.7 for each source signal.

3. An optical device according to claim 1, wherein the optical sources are adapted to vary the frequency of each optical source signal over time.

4. An optical device according to claim 1, wherein one or more of the optical signals are loading channels.

5. An optical device according to claim 1, wherein the DGD element is a birefringent element.

6. An optical device according to claim 5, wherein the DGD element is a PM fibre.

7. An optical device according to claim 1, wherein one or more of the optical sources are continuous wave (CW) lasers.

8. An optical device according to claim 1, wherein n equals 4.

9. An optical device for a wavelength division multiplexed (WDM) transmission system comprising:
   a plurality of optical sources, each source providing an optical source signal;
   a polarisation maintaining (PM) multiplexer coupled to the optical sources for multiplexing the optical source signals to form a polarised multiplexed signal; and,
   a PM fibre coupled to an output of the PM multiplexer,
   wherein the PM fibre is adapted to depolarise the multiplexed signal while retaining a substantial time-averaged degree of polarisation (DOP) for each source signal, wherein the fast and slow axes of the PM fibre are aligned at 45 degrees to the polarisation state of the polarised multiplexed signal.

10. An optical device for a wavelength division multiplexed (WDM) transmission system comprising:
    a plurality of optical sources, each source providing an optical source signal;
    a polarisation maintaining (PM) multiplexer coupled to the optical sources for multiplexing the optical source signals to form a polarised multiplexed signal; and,
    a differential group delay (DGD) element coupled to an output of the PM multiplexer,
    wherein the DGD element is adapted to depolarise the multiplexed signal while retaining a substantial time-averaged degree of polarisation (DOP) for each source signal, wherein the DGD element is adapted to introduce a DGD of $(1+2m)/2\Delta f$ where m is an integer and $\Delta f$ is the frequency difference between adjacent loading channels in the multiplexed signal.

11. An optical device according to claim 10, wherein m equals zero.

12. An optical device for a wavelength division multiplexed (WDM) transmission system comprising:
    a plurality of optical sources, each source providing an optical source signal;
    a polarisation maintaining (PM) multiplexer coupled to the optical sources for multiplexing the optical source signals to form a polarised multiplexed signal; and,
    a differential group delay (DGD) element coupled to an output of the PM multiplexer,
    wherein the DGD element is adapted to depolarise the multiplexed signal while retaining a substantial time-averaged degree of polarisation (DOP) for each source signal, wherein the optical source signals comprise a plurality of groups of loading channels at different frequencies, the frequency difference between each group being substantially greater than the frequency difference within each group, and wherein the DGD element is adapted to depolarise each group.

13. A method of processing optical signals comprising the acts of:
    passing a plurality of optical source signals through a polarisation maintaining multiplexer to form a polarised multiplexed signal; and,
    passing the multiplexed signal through an optical path that includes a DGD element to depolarise the multiplexed signal while retaining a substantial time-averaged degree of polarisation (DOP) for each source signal, wherein the source signal comprise a plurality of groups of loading channels at different frequencies, the frequency difference between each group being substantially greater than the frequency difference within each group, and wherein the step of passing the multiplexed signal through the DGD element depolarises each group.

14. A method according to claim 13, wherein the DGD element is adapted to retain a time-averaged DOP of above 0.7 for each source signal.

15. A method according to claim 13, wherein the optical sources are adapted to vary the frequency of each optical source signal over time.

16. A method according to claim 13, wherein one or more of the optical signals are loading channels.

17. A method according to claim 13, wherein the DGD element is a birefringent element.

18. A method according to claim 17, wherein the DGD element is a PM fibre.

19. A method of processing optical signals comprising the acts of:
    passing a plurality of optical source signals through a polarisation maintaining multiplexer to form a polarised multiplexed signal; and,
    passing the multiplexed signal through an optical path that includes a PM fibre to depolarise the multiplexed signal while retaining a substantial time-averaged degree of polarisation (DOP) for each source signal, wherein the fast and slow axes of the PM fibre are aligned at 45 degrees to the polarisation state of the polarised multiplexed signal.

20. A method of processing optical signals comprising the acts of:
    passing a plurality of optical source signals through a polarisation maintaining multiplexer to form a polarised multiplexed signal; and,
    passing the multiplexed signal through an optical path that includes a DGD element to depolarise the multiplexed signal while retaining a substantial time-averaged degree of polarisation (DOP) for each source signal, wherein the DGD element is adapted such that the angle between the time-averaged state of polarisation (SOP) of adjacent optical source signals in the depolarised multiplexed signal is 360/n degrees, where n is an integer greater than or equal to three.

21. A method according to claim 20, wherein n equals 4.

22. A method of processing optical signals comprising the acts of:
    passing a plurality of optical source signals through a polarisation maintaining multiplexer to form a polarised multiplexed signal; and
    passing the multiplexed signal through an optical path that includes a DGD element to depolarise the multiplexed signal while retaining a substantial time-averaged degree of polarisation (DOP) for each source signal, wherein the DGD element is adapted to introduce a DGD of $(1+2m)/2\Delta f$ where n is an integer and $\Delta f$ is the frequency difference between adjacent loading channels in the multiplexed signal.

23. A method according to claim 22, wherein m equals zero.

24. A method of processing optical signals comprising the acts of:
    passing a plurality of optical source signals through a polarisation maintaining multiplexer to form a polarised multiplexed signal; and passing the multiplexed signal through an optical path that includes a DGD element to depolarise the multiplexed signal while retaining a substantial time-averaged degree of polarisation (DOP) for each source signal, wherein the DGD element is operative to modify the polarisation state of one or more optical signals such that the polarisation state of each optical signal is orthogonal to the polarisation state of one or more of the remaining optical signals.

* * * * *